United States Patent [19]

Bentz

[11] E Re. 30,766

[45] Reissued Oct. 13, 1981

[54] MODULAR HEAT EXCHANGER WITH PIVOTAL CORES

[75] Inventor: Erwin J. H. Bentz, Washington, Ill.

[73] Assignee: Caterpillar Tractor Co., Peoria, Ill.

[21] Appl. No.: 152,014

[22] Filed: May 21, 1980

Related U.S. Patent Documents

Reissue of:

[64] Patent No.: 4,076,072
Issued: Feb. 28, 1978
Appl. No.: 620,999
Filed: Oct. 9, 1975

[51] Int. Cl.[3] ..... F28G 13/00

[52] U.S. Cl. ..... 165/41; 123/41.43; 165/86; 165/95; 165/148; 165/151

[58] Field of Search ..... 165/86, 95, 148, 151, 165/41; 123/41.43, 41.02, 41.04

[56] References Cited

U.S. PATENT DOCUMENTS

| | | | |
|---|---|---|---|
| 1,844,308 | 2/1932 | Armacost | 165/86 |
| 2,310,086 | 2/1943 | Howard | 165/86 |
| 2,919,114 | 12/1959 | Ljungstrom | 165/86 |
| 3,344,854 | 10/1967 | Boyajian | 165/95 X |
| 4,034,804 | 7/1977 | Meijer et al. | 165/148 |
| 4,144,933 | 3/1979 | Asselman et al. . | |

FOREIGN PATENT DOCUMENTS

| | | |
|---|---|---|
| 961847 | 1/1975 | Canada . |
| 434610 | 9/1926 | Fed. Rep. of Germany . |
| 974691 | 11/1964 | United Kingdom . |

OTHER PUBLICATIONS

Asselman et al., GAA *A High Performance Radiator* Intersociety Energy Conversion Conf., pp. 865–874, 1972.

*Primary Examiner*—Albert W. Davis
*Attorney, Agent, or Firm*—William B. Heming

[57] ABSTRACT

A heat exchanger is provided with pivotally mounted, angularly disposed, cooling modules or cores so as to increase the cooling capacity of the heat exchanger and, at the same time, to have a self-cleaning capability for the modules or cores. The angular disposition of the modules or cores results in a larger effective frontal area to the heat exchanger thereby increasing the cooling capacity of the heat exchanger. The angular orientation of adjacent modules or cores slightly compresses the oncoming air which provides an increased level of cooling for the cores. Each module or core can be pivoted about an axis a sufficient amount such that the opposite surface of each module or core is swept by the oncoming air which passes around and through the modules or cores in a direction opposite to an initial pass of said air whereby the modules or cores are cleaned by the reverse flow of air.

19 Claims, 7 Drawing Figures

MODULAR HEAT EXCHANGER WITH PIVOTAL CORES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to heat exchangers and, more particularly, to improved angularly disposed pivotally-mounted modules or cores for heat exchangers.

2. Description of the Prior Art

Heat exchangers, and primarily the type of heat exchangers used to cool internal combustion engines either on a moving vehicle or on a fixed stationary frame, must be provided with sufficient capacity to cool the engine by the passage of fluid, such as air, past and around the heat exchange element. In general, the volume of air passing the heat exchange member is the combined air from movement of the vehicle and from the cooling fan driven by the engine. In order to provide sufficient cooling capacity for the engine, it is necessary sometimes to use large fans operating at high speeds which cause vibrations and air noises. By government edict, the noise levels generated by the operation of an engine must be maintained within certain defined limits which limits, in many cases, cannot be met while still maintaining adequate cooling for the vehicle engine.

In addition, many vehicles are operated in areas where there is a considerable amount of flying particles, such as wood chips, leaves, dirt and the like, which particles cling to the heat exchange element and block the passage of air past, around and through the fins, thereby reducing the effective cooling of the vehicle engine.

To prevent the buildup of debris in the cooling fins of the heat exchanger, a rotating anti-clog screen was proposed by Boyajian in U.S. Pat. No. 3,344,854, whereby a screen is moved past the front of the heat exchange core, which screen collects the debris and carries it on past the cooling surface of the heat exchange core. The anti-clog screen is a separate element that is separately operated. The Howard U.S. Pat. No. 2,310,086 describes a system and apparatus whereby a heat exchange core is subdivided into segments which are each pivotally mounted. The segments are interconnected so that they can be rotated to open a space between adjacent segments and to permit the cooling air to flow past the segments at an angle. Howard does not provide an increased cooling surface area, nor does he provide for self-cleaning the segments of the core.

SUMMARY OF THE INVENTION

A heat exchanger is formed by mounting a plurality of modules or cores of the heat exchanger at an angle with respect to a centerline of the engine with each module or core being pivotally mounted at the top and at the bottom thereof with the surfaces of the module or core lying at an angle with respect to the adjacent module or core so that the effective surface of the heat exchanger exposed to the cooling air is substantially increased. Each module or core engages a stop so as to prevent the module or core from pivoting during use. Upon releasing the module or core from the stop, the module or core can be rotated about the pivotal axis thereof so as to expose the opposite surface to the flow of air through the module or core. The reversal of the direction of the air flow through the module or core will clean the debris and foreign matter from the module or core thereby restoring the effective cooling capacity of the module or core and extending the life span of the heat exchanger.

By angularly mounting the surfaces of the modules or cores of the heat exchanger, the effective cooling surface of the heat exchanger is substantially increased which increases the cooling capacity of the heat exchanger. Therefore, a smaller heat exchanger can be used to effectively cool a particular vehicle or the same size heat exchanger may be employed, but a smaller volume of air is required to be forced through the heat exchanger to create the desired amount of cooling. The smaller heat exchanger or the smaller volume of air to effectively cool the engine, permits the use of fans driven at lower speeds which are quieter in operation and within specified noise levels.

The coolants in the heat exchanger may flow through hollow trunnions about which each module or core of the heat exchanger is rotated, or the fluid may be piped from a top tank into each module or core of the heat exchanger through flexible tubing.

In one modified version, additional modules or cores for the heat exchanger are mounted on the side of the vehicle to increase the cooling capacity of the heat exchanger. These additional modules or cores are pivotally mounted and are self-cleaning by reversing the direction of flow of the cooling air through the module or core.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 1:
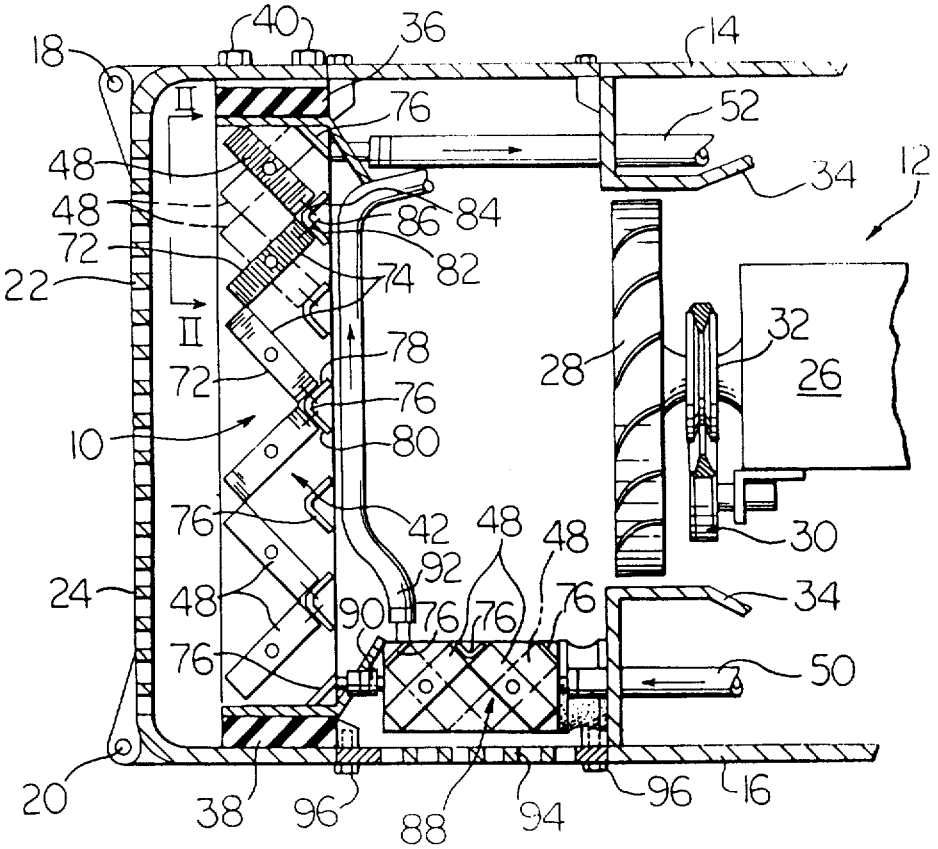
FIG. 1 is a plan view partially in section showing a preferred embodiment of the invention.
Figure 2:
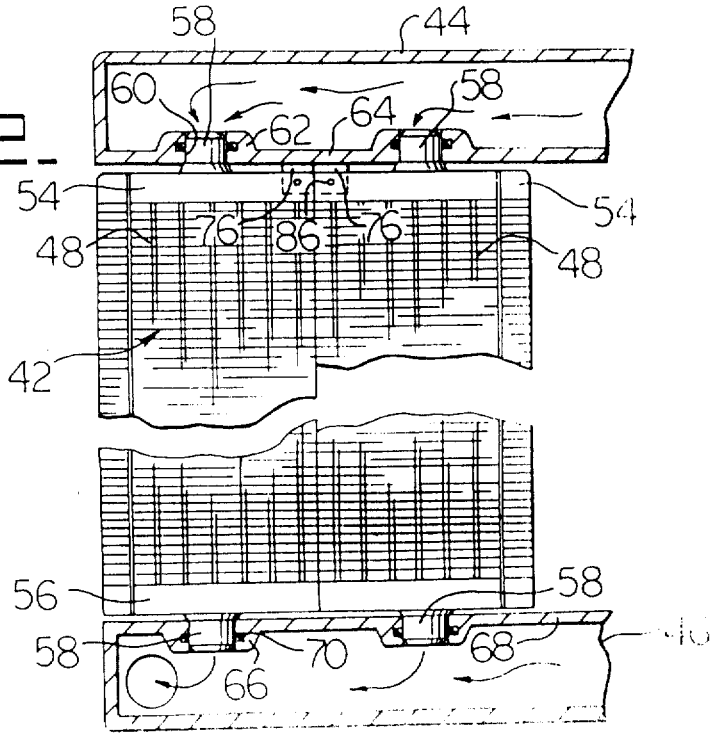
FIG. 2 is a partial, enlarged front view taken along the lines 2—2 of FIG. 1.

A preferred embodiment of the invention is shown in FIGS. 1 and 2 wherein a front mounted cooling system 10 is illustrated on the front end of a land vehicle 12, such as a crawler tractor or the like. It is understood that the design and construction of the present invention has wide application in surface-type heat exchangers where air is forced or drawn over the fins and tubes of coolant from an engine to reduce the temperature of the coolant. The heat exchanger may be associated with the engine of a land vehicle, with the engine of a stationary installation, or the like. As illustrated, the vehicle 12 has a frame with a pair of spaced apart side walls 14,16, each of which pivotally supports, by means of hinges 18,20, front grills 22,24, respectively. An engine 26, such as a liquid cooled internal combustion engine, is mounted on the frame between the walls 14,16 and has a fan 28 driven by a belt 30 and pulley 32 on the front end thereof. The frame of the vehicle has baffles or shrouds 34 carried by the walls 14,16 and surrounding the fan 28 so as to guide the flow of air from the front of the vehicle through the fan and on past the engine 26.

Extending between the side walls 14,16 and mounted thereto by means of resilient pads 36,38 and fasteners 40, is a radiator or heat exchanger 42 which comprises a top or header tank 44, a bottom or outlet tank 46 and a plurality of angularly oriented, pivotally mounted modules or cores 48. The engine 26 is cooled by a liquid coolant which is circulated therethrough by a pump, not shown, and is communicated through pipe 50 to the top tank 44 of the heat exchanger 42. The liquid coolant, which comes from the engine at an elevated temperature, is circulated through the modules or cores 48 where the temperature of the coolant is reduced. The cooled coolant flows from the modules or cores 48 into the bottom tank 46 and back to the engine 26 through pipe 52.

The modules or cores 48 are of conventional design having a plurality of through tubes which have attached thereto a plurality of radiating fins. A top plate 54 and bottom plate 56 of the module or core 48 has upwardly and downwardly extending hollow nipples or trunnions 58 which are adapted to sealingly nest in the openings 60 formed in the thickened portions 62 of the bottom wall 64 of the top tank 44 and in the thickened portions 66 of the top wall 68 of the bottom tank 46. The nipples or trunnions 58 of each core lie on a common axis which, in the form shown, is the vertical geometric centerline of the core. Seals 70 are provided between the nipples or trunnions 58 and the thickened portions 62,66 of the top and bottom tanks 44,46, respectively. The hot coolant from the engine flows into the top tank 44 and through the openings into the nipples or trunnions 58. The coolant flows through the tubes in the modules or cores 48 where the heat in the coolant is radiated to the fins and is removed by the passage of air over, through and around the fins and tubes. The coolant, with a reduced temperature, is collected in the bottom tank 46 where it is pumped back to the block of the engine 26.

The modules or cores 48 have a generally planar front surface 72 and a generally planar rear surface 74. The radiator or heat exchanger 42 has a vertical plane which lies perpendicular to the centerline of the vehicle 12. Adjacent modules or cores 48 have their front surfaces 72 angularly disposed with respect to the vertical plane of the radiator or heat exchanger 42 and with respect to each other as viewed in FIG. 1, such that each pair of modules or cores will converge toward each other to form a wedge-shaped trough therebetween. Air, which is forced or drawn through the grills 22,24, strikes the front surfaces 72 of the modules or cores 48 and pass through the modules or cores for cooling same. The wedge-shaped trough between adjacent modules or cores 48 has a tendency to cause the air to be slightly compressed as the bottom of the trough is approached. The slightly compressed air is more dense than regular air, which increased denseness, has a greater cooling capacity than regular air thereby increasing the cooling capacity of the radiator or heat exchanger.

The sum of the areas of the front surfaces of the modules or cores 48 is substantially larger than a large single core radiator of the conventional type. Therefore, a radiator with a plurality of angularly disposed modules or cores 48 has a substantially increased cooling capacity over a radiator of the same outside dimensions using a large single core for cooling. The angular disposition of each module or core 48 permits larger module or core surface areas to be exposed to oncoming air for cooling purposes. As a result, a radiator with the same size as before would have increased cooling capability with the present angled core design or a smaller radiator with the angled core design could be substituted for the larger radiator and have the same cooling capability as said larger radiator.

Stops 76 are provided on the bottom surface of wall 64 of the top tank 44 and have angularly disposed surfaces 78,80 with apertures 82 formed therethrough. Each module or core 48 has an aperture 84 in one side wall thereof, which aperture 84 is adapted to align with one of the apertures 82 in the surfaces 78,80 of the stops 76. A pin 86 is passed through the aligned apertures 82,84 to lock the module or core 48 in angled relationship with respect to the vertical plane of the radiator. In FIG. 1, the modules or cores 48, shown in solid lines, are pinned to stops 76 so that three converging troughs are formed therebetween. Upon removing each pin 86, its associated module or core 48 may be pivoted about the trunnions 58 until the apertured wall of the module or core 48 aligns with the adjacent stop 76 whereupon the pin 86 can be reinserted to lock the module or core 48 in a position with the rear surface 74 facing the grills 22,24. Oncoming air will now pass first through the rear surface 74 and on over, through and around the fins and tubes in the core and in the process will not only cool the coolants in the core, but also will flush out any debris, such as leaves, chips and the like, that was previously lodged in the front surface 72 of the core when said front surface 72 was facing the grills 22,24. In this way, the modules or cores 48 are self-cleaning. Clean, unobstructed cores are more efficient in producing maximum heat exchange, with the coolants circulating in the cores. Debris buildup in the core cannot only cause damage to the core, but also can reduce the effective cooling of the core resulting in operating the core at increase temperatures which can cause premature failure of the core. Therefore, reversing the air flow through the cores for self-cleaning can increase the useful life span of the cores.

Supplemental cooling capacity can be provided by installing an additional radiator 88 in the side wall 16 of the vehicle 12. The radiator 88 has a shortened top tank 44 and bottom tank 46 and, as shown, has one pair of modules or cores 48 pivotally mounted between said top and bottom tanks 44,46, respectively. The design, construction and operation of the modules or cores 48 in the radiator 88 is the same as with respect to radiator or heat exchanger 42. The modules or cores 48 may be pivoted from the solid line position of FIG. 1 to the dotted line position so as to reverse flush the cores clean. Stops 76 are provided for engaging the cores 48 to hold the cores in the desired angular position. The pipe 50 connects to top tank 44 (not shown) of the radiator 88 with a stub pipe 90 connecting the tank 44 of radiator 88 to the top tank 44 of the radiator or heat exchanger 42. Bottom tank 46 of radiator 88 is connected back to the engine 26 by means of return pipe 92 or to bottom tank 46 of radiator 42.

The vehicle heat exchanger of FIG. 1 may operate with both radiator 88 and radiator or heat exchanger 42, whereupon the heated coolant flows into top tank 44 of radiator 88 for cooling in radiator 88 with the remaining heated coolant flowing on to tank 44 of radiator or heat exchanger 42 for cooling by radiator or heat exchanger 42. The radiator or heat exchanger 42 may do all the cooling for the engine 26 by means of pipe 50 bypassing tank 44 of radiator 88 and going directly to the top tank 44 of radiator or heat exchanger 42.

A grill 94 is formed in the side wall 16 to protect the modules or cores 48. The grill 94 may be removed by removing the bolts 96 so as to gain access to the radiator 88 and so as to rotate the modules or cores 48.

Figure 3:
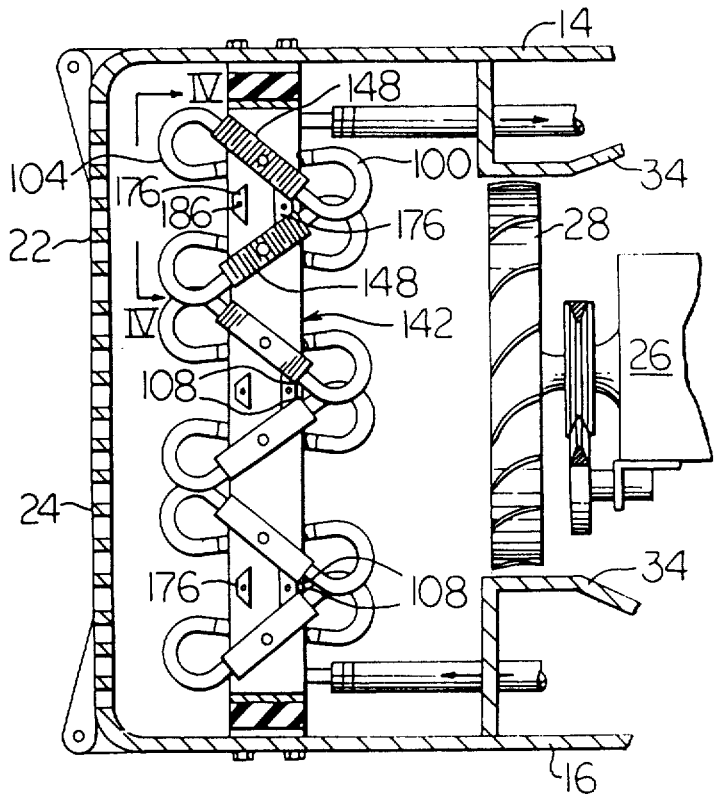
FIG. 3 is a plan view partially in section showing a modified version of the invention.
Figure 4:
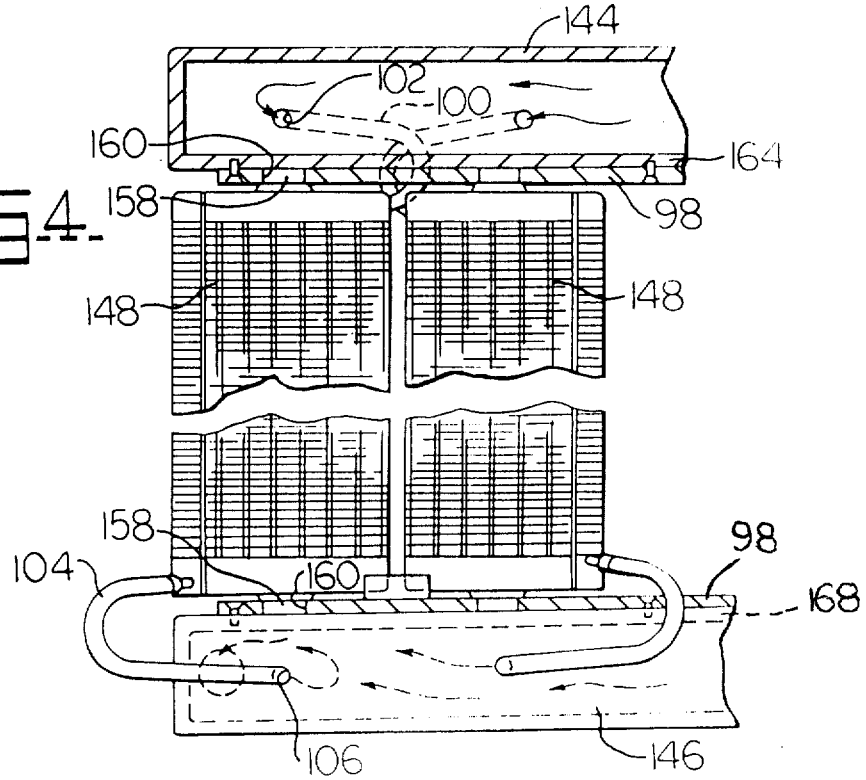
FIG. 4 is a partial, enlarged front view taken along the lines 4—4 of FIG. 3.

In the modified embodiment, shown in FIGS. 3 and 4, the frame, engine 26, walls 14,16, grills 22,24, baffles 34, fan 28 and mounting of the radiator 142 are all substantially the same as for the embodiment of FIGS. 1 and 2. The radiator 142 has top tank 144 and bottom tank 146 with a plurality of angularly disposed modules or cores 148 pivotally mounted therebetween. The modules or cores 148 have stub shafts or trunnions 158 mounted on the top and bottom edges thereof with said trunnions 158 engaging in bearing openings 160 in mounting plates 98 carried by the bottom wall 164 of top tank 144 and top wall 168 of bottom tank 146. Each module or core 148 has a flexible hose 100 connected from an opening 102 in the top tank 144 to an opening in the top edge of the module or core 148 and has a second flexible hose 104 connected from an opening in the lower edge of the module or core 148 to an opening 106 in the bottom tank 146. Conventional fittings are used to make the actual connection between the hoses 100 and 104, the tanks 144,146 and the modules or cores 148. The hoses 100 and 104 are positioned in such a way as to permit ready pivoting of the modules or cores 148 about the axis of the trunnions 158 without interference.

Stops 176 are provided on the mounting plate 98 of the tank 146 in a position to engage with one surface of the modules or cores 148 to hold the modules or cores in angled orientation relative to the plane of the radiator or heat exchanger 142. Pins or other appropriate means 186 are provided for securing the modules or cores 148 against the appropriate stops 176.

In the embodiment of FIGS. 3 and 4, the stops 176 are of such a size and are located in such a way as to position the modules or cores 148 with their facing corners 108 spaced apart a short distance so as to create an opening therebetween. In this way, some debris that normally would pile up in the converging trough between adjacent angularly disposed modules or cores 148 will be permitted to go on through, thereby reducing the frequency that the modules or cores 148 will have to be pivoted for self-cleaning purposes.

Figure 5:
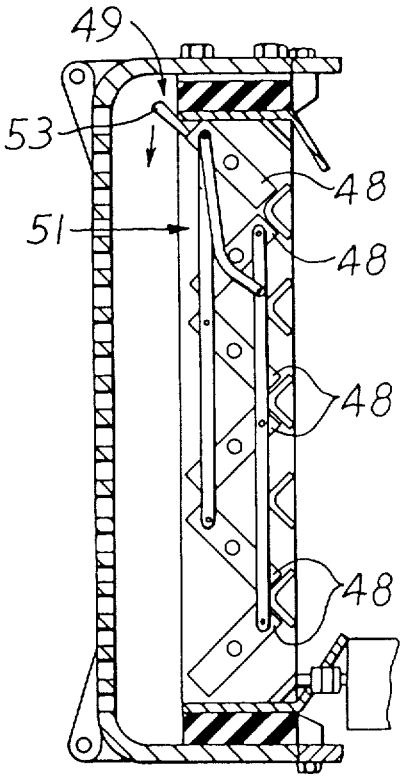
FIG. 5 is a top view of the cores in partial section showing the cores positioned at a first orientation and apparatus 49 for simultaneously rotating the cores.
Figure 6:
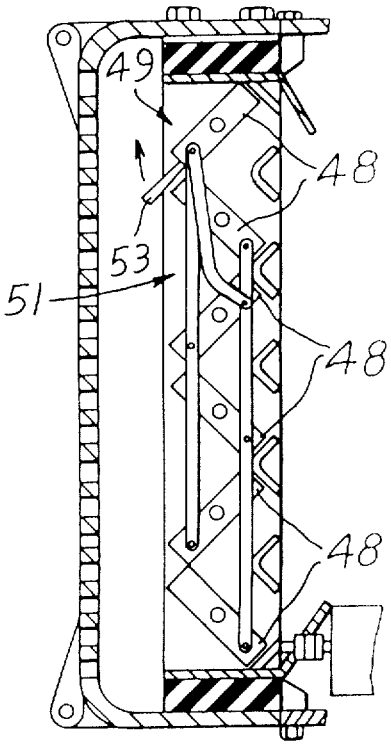
FIG. 6 is a top view of the cores in partial section showing the cores positioned at a second orientation and apparatus 49 for simultaneously rotating the cores.
Figure 7:
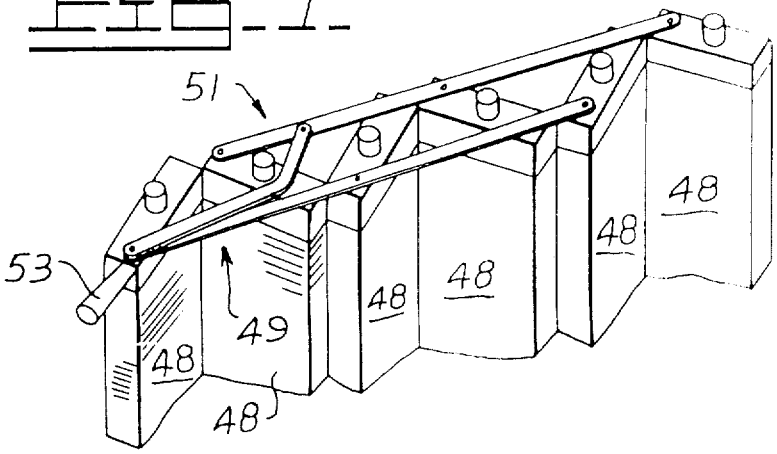
FIG. 7 is a perspective view of a portion of the cores and linkage 51 of the apparatus 49 for simultaneously rotating the cores.

It should be understood that increased convenience and utility can be attained for the subject invention through slight design modifications. For instance, and as shown in FIGS. 5, 6 and 7, all cooling modules or cores can be coupled and rotated simultaneously by apparatus 49 such as a universal linkage 51 and actuator 53 that can be remotely located. Such a device can also preclude the need for stops and lock pins to maintain alternate core positions. Additionally, in the event oil from hydraulic drive or implement control systems requires cooling, parallel connected auxiliary modules or cores would perform the function very effectively.

I claim:

1. A heat exchanger for an internal combustion engine comprising a top tank connected to said engine for receiving heated coolant, a bottom tank connected to said engine for returning cooled coolant to said engine, a plurality of cooling cores extending between said top tank and said bottom tank, means for pivotally mounting each said cooling core about an axis extending between said top tank and said bottom tank, each said core having a front surface and a rear surface, means for limiting the amount of pivoting of each core about said axis so as to expose first the front surface and then the rear surface of each core to oncoming air whereby air flowing past said cores will clean accumulated foreign matter from said cores upon reversal of the surfaces of said cores.

2. In the heat exchanger as claimed in claim 1 wherein said cores are angularly disposed with respect to each other and with respect to a plane lying perpendicular to the longitudinal axis of said engine.

3. In the heat exchanger as claimed in claim 1 wherein the surfaces of each adjacent pair of cores define an angle therebetween in which oncoming air is slightly compressed thereby increasing the cooling capacity of the cores.

4. In the heat exchanger as claimed in claim 1 wherein the means for pivotally mounting said cores is a hollow member through which the coolant flows to and from said cores.

5. In the heat exchanger as claimed in claim 1 wherein the means for pivotally mounting said cores is a pivot and socket member and wherein a flexible tube is connected between the top tank and each core and a second flexible tube is connected between each core and the bottom tank whereby the coolant flows to and from each core.

6. In the heat exchanger as claimed in claim 1 wherein the means for limiting the amount of pivoting of each core holds the adjacent edges of said cores spaced apart to permit loose debris to pass therebetween.

7. In the heat exchanger as claimed in claim 1 wherein holding means engage between each core and said means for limiting the amount of pivoting of each core for holding said core against said means for limiting the amount of pivoting of said core.

8. In the heat exchanger as claimed in claim 1 wherein a second heat exchanger is provided in parallel with said first heat exchanger, said second heat exchanger has at least two pivoted angularly disposed cores.

9. An internal combustion engine having a heat exchanger with a top tank and a bottom tank, said top tank being connected to said engine for receiving heated coolant, said bottom tank being connected to said engine for returning cooled coolant to said engine, a plurality of cooling cores extending between said top tank and said bottom tank, means for *pivotally* mounting each said cooling core at an angle with respect to each other and at an angle to the plane lying perpendicular to the axis of the engine whereby increased cooling core surface is exposed to oncoming air passing through said heat exchanger.

10. The internal combustion engine as claimed in claim 9 wherein each core has a front surface and a rear surface and wherein each core is pivotally mounted between said top tank and bottom tank so as to be selectively positioned with either the front surface or the rear surface of the core exposed to oncoming air.

11. The internal combustion engine as claimed in claim 10 wherein the surfaces of each adjacent pair of cores define an angle therebetween in which oncoming air is slightly compressed thereby increasing the cooling capacity of the cores.

12. The internal combustion engine as claimed in claim 10 wherein the means for pivotally mounting said cores is a hollow member through which the coolant flows to and from said cores.

13. The internal combustion engine as claimed in claim 10 wherein the means for pivotally mounting said cores is a pivot and socket member and wherein a flexible tube is connected between the top tank and each core and a second flexible tube is connected between each core and the bottom tank whereby the coolant flows to and from each core.

14. The internal combustion engine as claimed in claim 10 wherein the means for limiting the amount of pivoting of each core holds the adjacent edges of said cores spaced apart to permit loose debris to pass therebetween.

15. The internal combustion engine as claimed in claim 10 wherein holding means engage between each core and said means for limiting the amount of pivoting of each core for holding said core against said means for limiting the amount of pivoting of said core.

16. The internal combustion engine as claimed in claim 9 wherein a second heat exchanger is provided in parallel with said first heat exchanger, said second heat exchanger having at least two angularly disposed cores, a top tank of said heat exchanger receiving heated coolant from said engine, said top tank of said second heat exchanger being connected to and communicating with the top tank of said first heat exchanger for transporting heated coolant from said engine to said first heat exchanger, and means for returning cooled coolant from a bottom tank of said second heat exchanger directly back to said engine.

17. The internal combustion engine as claimed in claim 16 wherein said cores are pivotally mounted for exposing opposite surfaces to oncoming air.

18. A heat exchanger, comprising:

a plurality of cooling cores each having first and second opposed outer surfaces and first and second opposed edges, said cooling cores being generally positioned in side by side relationship and movable between a first position at which the first edges of adjacent cores are in close proximity and oriented for passing cooling fluid through the cores in a direction from the first surface to the second surface and a second position at which the second edge of adjacent cores are in close proximity and oriented for passing cooling fluid through the cores in a direction from the second surface to the first surface;

means for pivotally mounting said cores for pivotal movement of the cores less than 180° during movement between the first and second positions.

19. A heat exchanger, as set forth in claim 18, including means for synchronously pivoting said cores.

* * * * *